(12) United States Patent
Beaugeant et al.

(10) Patent No.: US 8,406,430 B2
(45) Date of Patent: Mar. 26, 2013

(54) SIMULATED BACKGROUND NOISE ENABLED ECHO CANCELLER

(75) Inventors: Christophe Beaugeant, Mouans Sartoux (FR); Philippe Degry, Antibes (FR)

(73) Assignee: Infineon Technologies AG, Neubiberg (DE)

( * ) Notice: Subject to any disclaimer, the term of this patent is extended or adjusted under 35 U.S.C. 154(b) by 487 days.

(21) Appl. No.: 12/622,388

(22) Filed: Nov. 19, 2009

(65) Prior Publication Data

US 2011/0116644 A1     May 19, 2011

(51) Int. Cl.
*H04B 3/20* (2006.01)
(52) U.S. Cl. ......... 381/66; 381/93; 381/83; 379/406.01; 379/406.05; 379/406.08; 379/406.11; 379/406.12; 379/406.13; 379/406.14
(58) Field of Classification Search .................... 381/83, 381/93, 66; 704/226, 233; 379/406.1, 406.05–9, 379/401.1–401.14, 406.01, 406.08, 406.11–406.14
See application file for complete search history.

(56) References Cited

U.S. PATENT DOCUMENTS

| 2003/0018471 A1* | 1/2003 | Cheng et al. ................. 704/233 |
| 2007/0154031 A1* | 7/2007 | Avendano et al. .............. 381/92 |

OTHER PUBLICATIONS

Hands-Free Audio and its Application to Telecommunication Terminals, Martin Schoenle et al., AES 29th International Conference, Seoul, Korea, Sep. 2-4, 2006, p. 1-7.

* cited by examiner

*Primary Examiner* — Disler Paul
(74) *Attorney, Agent, or Firm* — SpryIP, LLC

(57) ABSTRACT

An apparatus may include a noise estimation unit configured to determine a noise spectrum associated with a noise signal, and generate a filter based on the determined noise spectrum. The apparatus may also include a noise synthesis unit configured to generate a colored noise using the filter generated by the noise estimation unit. The apparatus may be incorporated in an echo canceller.

9 Claims, 3 Drawing Sheets

SIMULATED BACKGROUND NOISE ENABLED ECHO CANCELLER

BACKGROUND

Acoustic echo generally refers to a phenomenon in which a sound wave originated from a sound source is reflected by a surface of an object and returned to the sound source. An example of acoustic echo, which can be often found in the everyday life, includes a natural echo with single reflection. A direct sound is the opposite of the acoustic echo. The term "direct sound" refers to a directly heard sound without being reflected by the surface of an object. In other words, the acoustic echo indicates a reflected sound that arrives about 0.05 or longer second behind the direct sound in terms of the hearing sense. Therefore, the echo sound and the direct sound are heard with a time difference. In the place with multiple reflecting surfaces, such as a room and a vehicle interior, the reflection is repeated several times in various directions, generating a complex echo sound. This is an example of a multiple reflection echo, also known as a reverberation.

With the development of communication technology, the communication system is evolving from a wired communication system into a wireless communication system. In order to provide a convenient call environment, there has been proposed a hands-free technique in which a user talks over the phone using a microphone and a speaker instead of the earpiece and mouthpiece. The hands-free technique is applicable to a car hands-free phone, a remote conference system, a speaker-phone system, mobile and stationary wireless telephony devices, and so on.

In the communication system where voice communication between the user and the communication device is performed through the speaker and the microphone, it is necessary to take into consideration the fact that a part of the voice or acoustic sound output from the speaker is input to the microphone. Therefore, the acoustic echo component should be taken into account to provide a smooth call. In a full-duplexing hands-free voice communication system, if the acoustic echo component is not appropriately canceled, a far-end user hears back his/her own voice after a lapse of a predetermined time, together with a voice of a near-end user. In other words, the far-end user is inconvenienced by an echo phenomenon during a call.

The acoustic echo occurs because a far-end user's signal output from the speaker is input to the microphone via an acoustic echo path, together with a noise, and then transmitted back to the far-end user. As a result, the far-end user receives the undesired echo signal along with the near-end user's signal.

The acoustic echo path of the echo signal undergoes a frequent change with the passage of time when a mobile terminal operates not only in a normal voice call mode but also in a video conference mode or a speaker phone mode. For example, the acoustic echo path undergoes a change even when a participant of the conference moves his/her head, arm and shoulder during the video conference.

Therefore, many conventional mobile terminals use an Automatic Gain loss Control (AGC) to cancel the echo phenomenon. In one implementation, the AGC then reduces echo based on the reduction of energy (or power) of the microphone signal depending on the energy of the loudspeaker signal or on an estimated energy of the echo. This technique can be seen as the application of a gain G on the energy (or power) of the microphone, G depending on the energy of the loudspeaker or of the estimated energy of the echo. The gain G is in practice applied on successive frames m in the time domain, in the frequency domain or in any time-frequency domain.

Although the foregoing technique may be effective in removing echo, the far-end user also hears noise muting as a result of the echo removal. This noise muting is also known as noise modulation. One technique to mitigate noise modulation is to apply a threshold to the gain G. This is effective in reducing the noise modulation, but the threshold application may reduce effectiveness of the echo cancelation. Another technique to mitigate noise modulation is to use noise injection. This technique adds artificial noise, or so called "comfort noise" with the same energy as the surrounding noise suppressed by the echo cancelation. The disadvantage of noise injection using white noise or pink noise relates to the frequency characteristic of the injected noise compared to the background noise eliminated by the echo cancelation. The mismatch between the frequency characteristics of the injected noise and the actual background noise leads to the irritating effect that the far-end speaker hears the noise changing when he/she speaks. That is, the user hears white or pink noise when he/she speaks and when silent, the user hears the actual background noise.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

Figure 1:
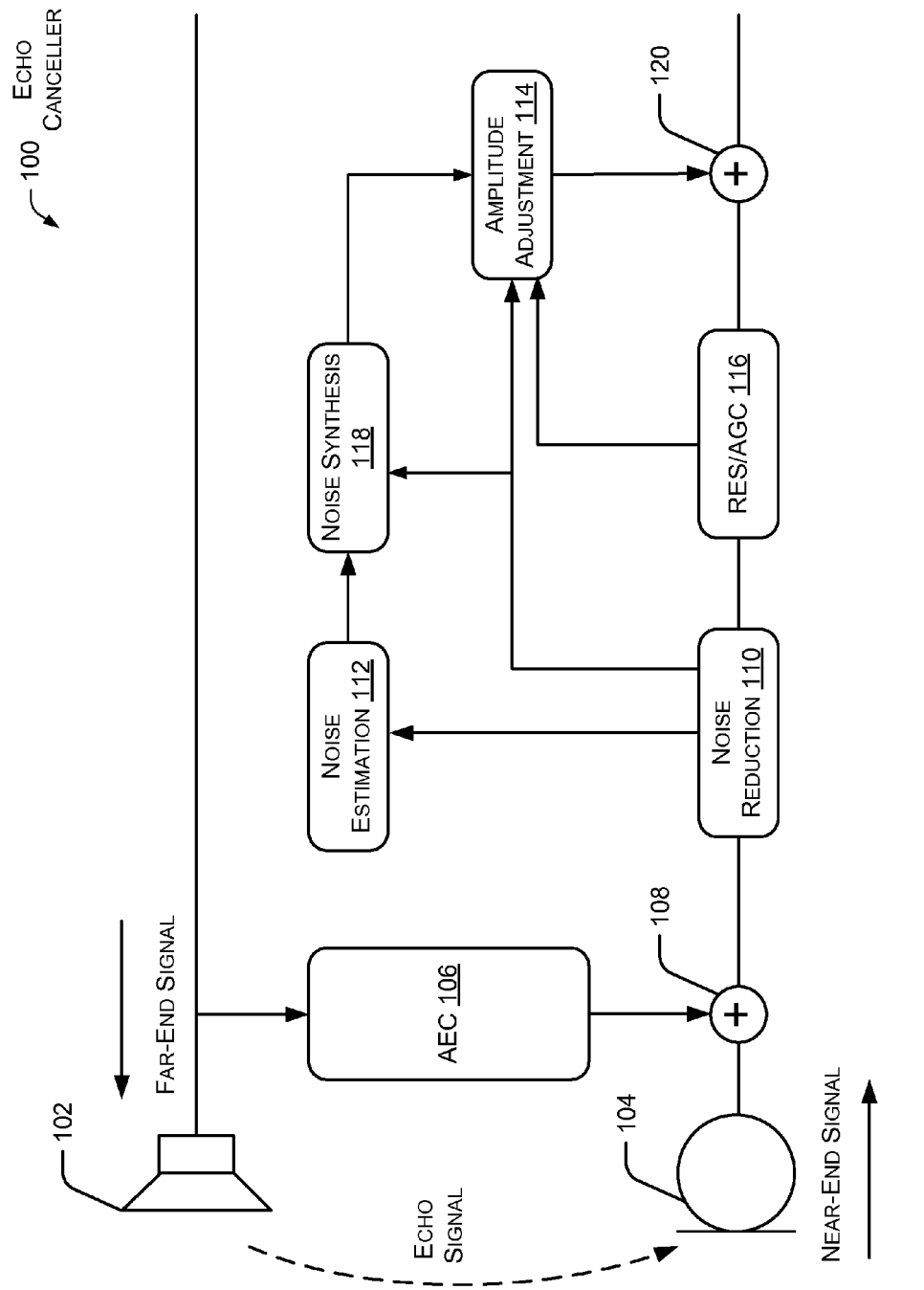
FIG. 1 illustrates a block diagram of various elements or units that may be associated with an echo canceller according to one implementation described herein.

FIG. 1 illustrates a block diagram of various elements or units that may be associated with an echo canceller 100 according to one implementation described herein. A Far-end signal, which may be speech or another audio signal, may be output from a speaker 102. The far-end signal may create an echo signal. The echo signal may be caused when some or the entire far-end signal reflects off of one or more walls, objects, and so on. Some or the entire echo signal may be captured by a microphone 104. In addition to the echo signal, the microphone 104 may also capture a near-end signal from one or more individuals speaking in a near-end location, as well as independent background noise. A goal of the echo canceller 100 is to estimate or predict the echo and then subtract the echo estimate from the raw microphone signal to produce a processed microphone signal which contains little or no echo.

The echo canceller 100 may use an acoustic echo canceller (AEC) 106 to reduce or eliminate any echo signal captured by the microphone 104 and combined with the near-end signal. Generally, the AEC 106 may incorporate an adaptive filter. The AEC 106 may generate an estimated echo signal from the far-end signal, and may output an estimated echo signal to an adder 108. The adder 108 may calculate a signal having reduced echo by subtracting the estimated echo signal from a signal output from the microphone 104, and may output the signal having reduced echo to a noise reduction unit 110. In one implementation, the signal output from the microphone 104 is a frequency domain signal that is generated using a frequency domain transform. In another implementation, the frequency domain signal is created after the signal is output from the microphone 104. Furthermore, although not illustrated, the signal having reduced echo may also be fed to the AEC 106 to control an estimation capability of the adaptive filter thereof.

The signal having reduced echo received by the noise reduction unit 110 may be a signal in the frequency domain. The noise reduction unit 110 generally may be designed determine any background noise that may be removed to improve the signal to noise ratio of the received signal having reduced echo. As is illustrated in FIG. 1, the noise reduction unit 110 determines how much noise to reduce from the signal having reduced echo and sends an indication of that reduction to a noise estimation unit 112 and an amplitude adjustment unit 114. Moreover, the noise reduction unit 110 also sends the indication to a residual echo suppression (RES) unit 116. The RES 116 is responsible for suppressing some or all of the echo that may be remaining in the signal having reduce echo.

The noise estimation unit 112 is coupled to a noise synthesis unit 118. The combined functionalities of the noise estimation unit 112 and the noise synthesis unit 118 may produce injection noise or comfort noise that is intended to compensate for the adverse acoustic fractures cased by echo elimination by the RES 116 and the noise reduction by the noise reduction unit 110. The injection noise generated by the units 112 and 118 is fed to the amplitude adjustment unit 114. The amplitude adjustment unit 114 considers all signals input thereto in generating a signal that is combined, by way of an adder 120, with a signal having undergone further echo suppression by the RES 116. The RES 116 may be part of an Automatic Gain loss Control associated with the echo canceller 100.

The following description will focus on the operational aspects and functionalities of the noise estimation unit 112 and the noise synthesis unit 118. These units 112 and 118 may be used in connection with the echo canceller 100 illustrated in FIG. 1. However, the units 112 and 118 may also be used in other echo canceller implementations. In one implementation, the noise estimation unit 112 and the noise synthesis unit 118 generate noise that has a characteristic near or very similar to the noise reduced by the noise reduction unit 110. However, more generally, any capable unit associated with a noise generating arrangement may perform the following acts.

In the following description, the variables m and k are used. The variable m denotes a frame of a signal and k denotes a frequency bin associated with a given frame.

The process of associating noise with a signal having reduced echo includes determining an estimation of the noise spectrum N(m,k) of the noise in the frequency domain. A filter $h_N(m)$ having a spectrum that is similar to the spectrum of N(m,k) may be created. The coefficients of the filter $h_N(m)$ may be obtained through an inverse Fourier transform of the noise spectrum N(m,k). In addition, a white noise or pink noise r(m) may be generated. The filter $h_N(m)$ may be used to generate a colored noise $r_N(m)=h_N(m)*r(m)$ having the spectrum of N(m,k). This colored noise $r_N(m)$ may be added to the signal having reduced echo.

To elaborate further, noise estimation may be done in the frequency domain through the Fourier transform of successive analysis frames m, with overlap between successive frames. Referring to FIG. 1, the Fourier transform may be performed within the noise reduction unit 110. The frequency transform may provide a signal Y(m,k), which may be the energy of a signal produced by the microphone 104.

In the frequency domain, the noise spectrum estimation may be based on the following rule, where $\alpha_{down} > \alpha_{up}$, and foregoing variables are each attenuation constants. The noise spectrum estimation may be performed by the noise estimation unit 112.

$N^2(m,k)=\alpha_{up} \cdot Y^2(m,k)+(1-\alpha_{up})N^2(m-1,k)$ if $Y^2(m,k) > N^2(m-1,k)$ $N^2(m,k)=\alpha_{down} \cdot Y^2(m,k)+(1-\alpha_{down})N^2(m-1,k)$ if $Y^2(m,k) < N^2(m-1,k)$ A random noise r(m) may be generated for each frame. And for each frame m, a finite impulse response (FIR) filter $h_N(m)$ may be computed from the noise spectrum N(m,k). The coefficients of the filter may be obtained through the inverse Fourier transform of the noise spectrum vector N(m,k). The noise estimation unit 112 may perform the foregoing tasks. The noise estimation unit 112 may also generate random noise r(m).

In the noise synthesis unit 118, a convolution of a random noise r(m) with the filter $h_N(m)$ may be applied to obtain the shaped colored noise $r_N(m)=h_N(m)*r(m)$.

In the amplitude adjustment unit 114, the noise $r_N(m)$ may be multiplied by a gain $G_{NR}(m)$, which may be generated by the noise reduction unit 110, proportional to the amount of noise reduction applied in the signal having reduced echo and inversely proportional to the gain $1-G_{RES}(m)$ applied in the RES unit 116. The noise $r_N(m)$ may be expressed as:

$r_N(m)=K(m)*r_N(m)$ with $K(m)=\alpha \cdot G_{NR}(m) \cdot (1-G_{RES}(m)+\gamma)$.

Where $G_{RES}(m)$ is the gain applied by the RES unit 116, $G_{NR}(m)$ is the amount of noise reduction applied by the noise reduction unit 110, $\alpha$ is a parameter enabling the tuning of the final amplitude of the injected noise, and $\gamma$ is an extra variable that permits tuning of the amount of noise which is injected even if the echo reduction gain is zero, i.e. during periods when no echo is reduced. As the gain $G_{NR}(m)$ is computed in the frequency domain, one implementation computes the gain as the average of the gains through the amount of bins $$G_{NR}(m) = \frac{1}{n_f}\sum_{f=1}^{n_f} G_{NR}(m,k)$$

where $n_f$ stands for the number of frequency bins of the noise reduction, $G_{NR}(m,k)$ the gain computed by the noise reduction unit 110.

Specifics of exemplary procedures (methods) are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable storage media. The computer-readable storage media can be any available media that can be accessed by a computing device to implement the instructions stored thereon. The device illustrated in FIG. 1 may implement the described procedures. However, other devices may also implement the described procedures.

Figure 2:
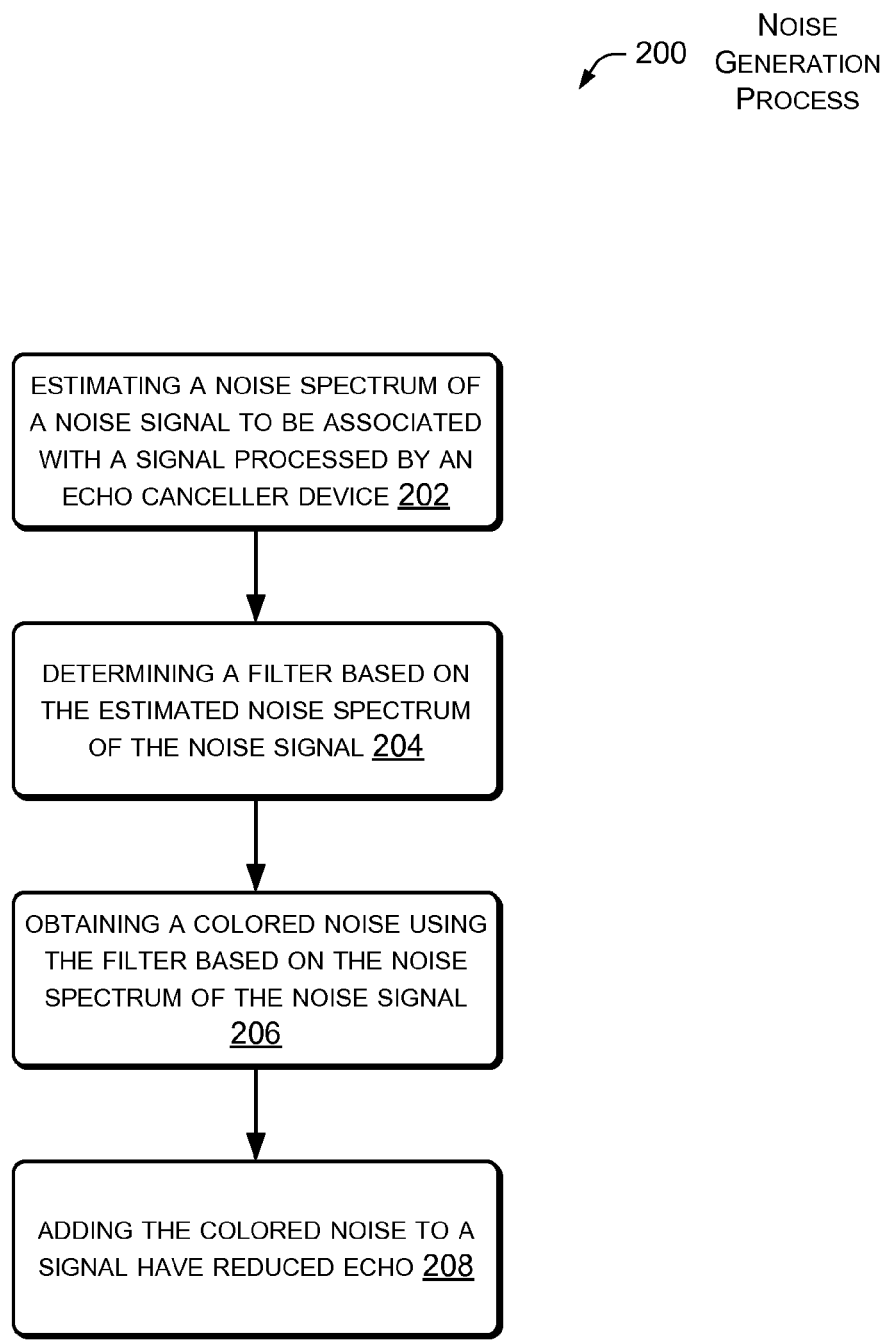
FIG. 2 is a flow diagram illustrating a noise generation process in accordance with one implementation described herein.

FIG. 2 is a flow diagram illustrating a noise generation process 200 in accordance with one implementation described herein. At block 202, the act of estimating a noise spectrum of a noise signal to be associated with a signal processed by an echo canceller device is performed. At block 204, the act of determining a filter based on the estimated noise spectrum of the noise signal is performed. At block 206, the act of obtaining a colored noise using the filter based on the noise spectrum of the noise signal is performed. At block 208, the act of adding the colored noise to a signal have reduced echo is performed.

Figure 3:
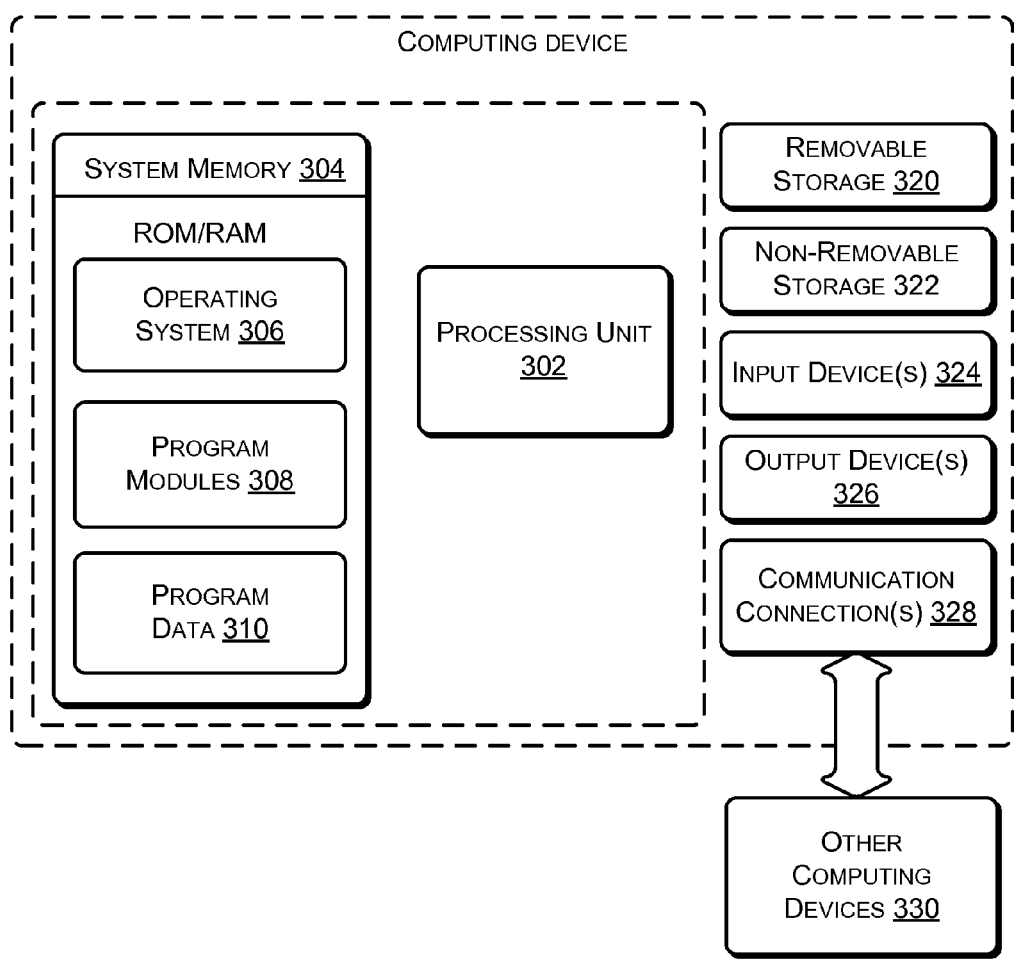
FIG. 3 is an illustrative computing device that may be used to implement the devices, units, modules, apparatuses, and hardware discussed herein.

FIG. 3 is an illustrative computing device that may be used to implement the devices, units, modules, apparatuses, and hardware discussed herein. In a very basic configuration, the computing device 300 includes at least one processing unit 302 and system memory 304. Depending on the exact configuration and type of computing device 300, the system memory 304 may be volatile (such as RAM), non-volatile (such as ROM and flash memory) or some combination of the two. The system memory 304 typically includes an operating system 306, one or more program modules 308, and may include program data 310.

For the present implementations, the program modules 308 may realize the various elements described as being associated with the architectures and implementations herein. Other modules and device functionalities described herein may also be part of the program modules 308. The computing device 300 may have additional features or functionality. For example, the computing device 300 may incorporate echo cancelation functionality. And, the computing device 300 may also include additional data storage devices (removable and/or non-removable) such as, for example, magnetic disks, optical disks, or tape. Such additional storage is illustrated in FIG. 3 by removable storage 320 and non-removable storage 322. Computer storage media may include volatile and non-volatile, removable and non-removable media implemented in any method or technology for storage of information, such as computer readable instructions, data structures, program modules, or other data. The system memory 306, removable storage 320 and non-removable storage 322 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be part of the device 300. Computing device 300 may also have input device(s) 324 such as keyboard, mouse, pen, voice input device, and touch input devices. Output device(s) 326 such as a display, speakers, and printer, may also be included. These devices are well known in the art and need not be discussed at length.

The computing device 300 may also contain a communication connection 328 that allow the device to communicate with other computing devices 330, such as over a network. The communication connection may also enable the computing device 300 to wirelessly communicate with many different types of wireless service providers and medium.

Various modules, units and techniques may be described herein in the general context of computer-executable instructions, such as program modules, executed by one or more computers or other devices. Generally, program modules include routines, programs, objects, components, data structures, and so forth, for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

For the purposes of this disclosure and the claims that follow, the terms "coupled" and "connected" have been used to describe how various elements and/or units interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

The invention claimed is:

1. A method, comprising:
    estimating a noise spectrum of a noise signal to be associated with a signal processed by an echo canceller device;
    determining a filter based on the noise spectrum of the noise signal; and
    obtaining a colored noise using the filter based on the noise spectrum of the noise signal, the obtaining including convoluting a random noise with the filter to obtain the colored noise.

2. The method according to claim 1, wherein the determining includes generating the filter by taking the inverse Fourier transform of the noise spectrum of the noise signal.

3. The method according to claim 1, further comprising adding the colored noise to a signal have reduced echo.

4. The method according to claim 1, wherein the determining includes determining a finite impulse response (FIR) filter.

5. An apparatus, comprising:
    a noise estimation unit associated with an echo canceller device and configured to:
        determine a noise spectrum associated with a noise signal, and
        generate a filter based on the determined noise spectrum; and
    a noise synthesis unit associated with the echo canceller device and configured to generate a colored noise by convoluting a random noise with the filter generated by the noise estimation unit.

6. The apparatus according to claim 5, wherein the noise estimation unit determines the noise spectrum based on a Fourier transform of the noise signal.

7. The apparatus according to claim 5, further comprising an amplitude and adjustment unit configured to add the colored noise to a signal having reduced echo.

8. The apparatus according to claim 7, wherein the echo canceller device is to generate the signal having reduced echo.

9. The apparatus according to claim 5, wherein the filter is a finite impulse response (FIR) filter.

\* \* \* \* \*